March 10, 1970 TSUNEO KOSUGI ET AL 3,499,997

SYSTEM FOR CONTROLLING THE LEVELS OF MAGNETICALLY RECORDED AND REPRODUCED SIGNALS IN A VIDEO TAPE RECORDER

Filed March 15, 1966 2 Sheets-Sheet 1

INVENTORS
TSUNEO KOSUGI
TAKEO KANBARA
BY Louis Bernat
ATTORNEY

March 10, 1970 TSUNEO KOSUGI ET AL 3,499,997
SYSTEM FOR CONTROLLING THE LEVELS OF MAGNETICALLY RECORDED
AND REPRODUCED SIGNALS IN A VIDEO TAPE RECORDER
Filed March 15, 1966 2 Sheets-Sheet 2
FIG. 3
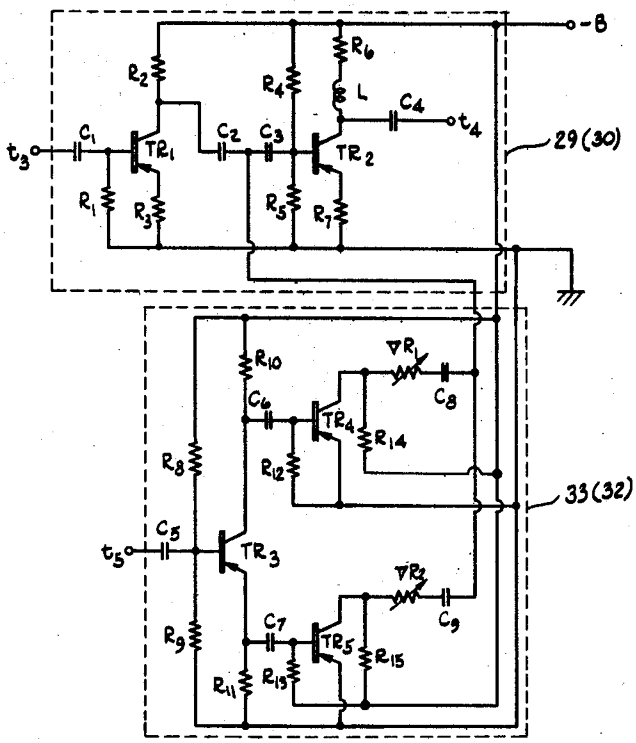
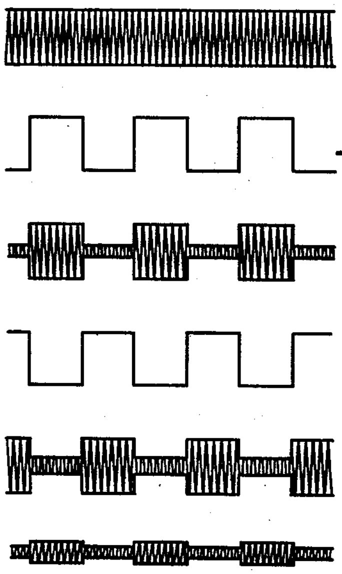
FIG. 5(a)
FIG. 5(b)
FIG. 5(c)
FIG. 5(d)
FIG. 5(e)
FIG. 5(f)
FIG. 4
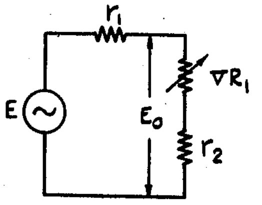
INVENTORS
TSUNEO KOSUGI
TAKEO KANBARA
BY Louis Bernat
ATTORNEY United States Patent Office 3,499,997

Patented Mar. 10, 1970

3,499,997

SYSTEM FOR CONTROLLING THE LEVELS OF MAGNETICALLY RECORDED AND REPRODUCED SIGNALS IN A VIDEO TAPE RECORDER

Tsuneo Kosugi and Takeo Kanbara, Yokohama, Japan, assignors to Victor Company of Japan, Limited, Yokohama, Japan, a corporation of Japan Filed Mar. 15, 1966, Ser. No. 534,500
Claims priority, application Japan, Mar. 19, 1965, 40/16,025
Int. Cl. H04n 5/78
U.S. Cl. 179—100.2 9 Claims

ABSTRACT OF THE DISCLOSURE

A magnetic tape recorder for color television signals uses a plurality of heads which sequentially scan oblique tracks on a tape. Each head is identified by a segment on a commutator which rotates in synchronization with the heads. The output of the commutator is applied to a clamp circuit to raise or lower the amplitude of signals to or from the heads in a manner which compensates for differences between the heads.

This invention relates to a magnetic recording and reproducing system and more particularly to a system having a plurality of magnetic heads for sequentially scanning a magnetic medium. Uniform recording and reproduction of signals is obtained during the respective time intervals while the heads are scanning, irrespective of variations in the characteristics of the magnetic heads.

The invention is particularly, although not exclusively, useful in a system for magnetic recording and reproducing of signals such as television video signals. Two or more equi-angularly spaced rotatable magnetic heads are arranged to sequentially scan a magnetic tape. One field or frame of the television video signal is recorded or reproduced during the interval while each head is scanning the tape. With such systems, there are unavoidable variations in the characteristics of the magnetic heads. Heretofore, these variations have produced non-uniformities in the levels of the signals recorded or reproduced, with resulting severe distortions in reproduced pictures.

The general object of the invention is to eliminate the disadvantages of conventional systems, and to provide a system where the levels of recorded signals are maintained substantially uniform, irrespective of variations in the characteristics of the magnetic heads.

A more specific object of the invention is to provide a system which is comparatively simple in construction and operation. Yet another object is to use a minimum number of component parts to provide a highly stable, reliable, and readily adjusted tape recorder. Still another object is to accommodate variations in operating conditions.

According to one aspect of this invention, control means are provided responsive to a control signal which is synchronized with rotation of magnetic heads. This signal controls the relative amplitude levels of transmission of a signal to or from the heads during the respective time intervals of sequential scanning of a medium by the heads.

This arrangement may be used in recording to make it possible for the magnetic heads to be operated at saturation points, or points at which maximum responses are obtained. The system is also useful during playback to eliminate variations produced solely in the reproducing operation.

According to a specific feature of the invention, the level control means comprises a plurality of impedance means, preferably resistors. Switching means are controlled responsive to a control signal for sequentially connecting the impedance means into a parallel relation with an output circuit of an amplifier used for transmission of the signal. Thus, a common amplifier is used. The arrangement is much simpler than it would be if an attempt were made to use separate amplifiers, mixer circuits, and the like.

In accordance with a further specific feature of the invention, the switching means comprises a plurality of transistors respectively connected in series with the impedance means. The transistors are sequentially rendered conductive in response to the control signal.

Still another feature of the invention lies in the provision of switch control means in the form of a transistor having emitter and collector electrodes coupled to the switching transistors. The control signal is applied to the base electrode of the switching transistor.

This invention contemplates other and more specific objects, features and advantages which will become more fully apparent from the following detailed description taken in conjunction with the accompanying drawings which illustrate a preferred embodiment and in which:

FIGURE 3 is a circuit diagram of a clamping circuit used in the system shown in FIGURE 2;

FIGURE 4 is a circuit diagram for explaining the principle of operation of the system according to the invention; and FIGURES 5(*a*) to (*f*) are wave forms showing the signals produced at various points in the system.

Figure 1:
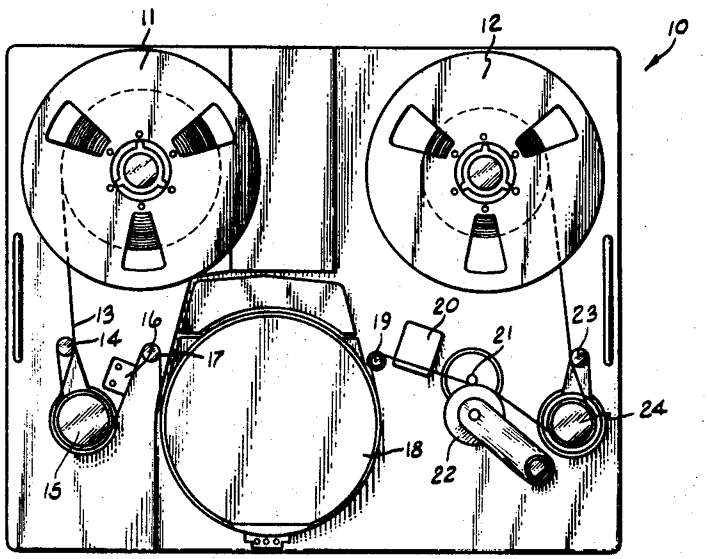
FIGURE 1 is a top plan view of a magnetic recording and reproducing apparatus for a system constructed according to this invention.

In FIGURE 1, the reference numeral 10 generally designates a magnetic recording and reproducing apparatus which comprises a supply reel 11 mounted at a position higher than the position of a take up reel 12. A magnetic tape 13 travels from the supply reel 11 past a tension arm 14 to a guide roller 15 and then past a vacuum control device 16 and about a guide roller 17 to a guide drum 18. The tape extends about the guide drum 18, slightly more than 180 degrees, and travels therefrom past a guide roller 19 to engage a fixed magnetic head 20 for recording audio and control signals. The tape then travels between a capstan 21 and a pinch roller 22, around a guide roller 24, and past a tension arm 23 to the take up reel 12.

Figure 2:
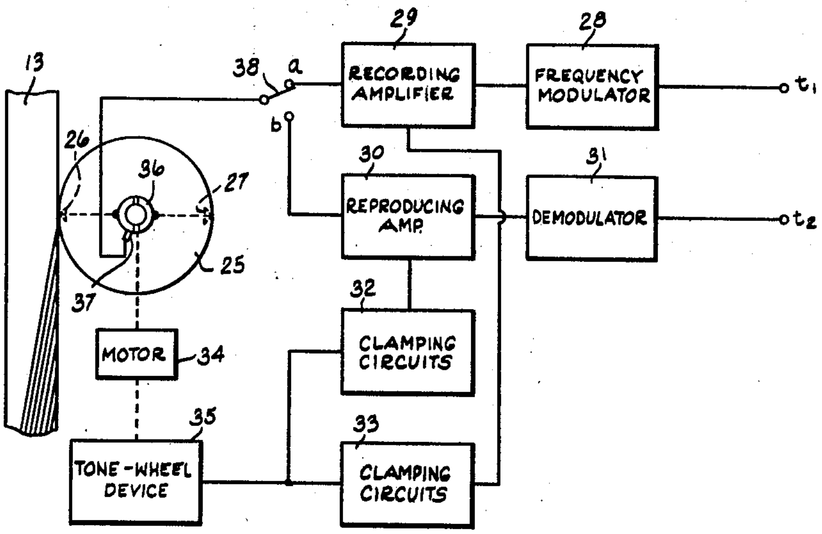
FIGURE 2 is a schematic block diagram showing the essential portions of a system constructed according to the invention.

The guide drum 18 is formed in two axially spaced sections to define a circumferential slot in which a rotating disk 25 (FIG. 2) is disposed. Two magnetic heads 26 and 27 are mounted at diametrically opposite points on the disk 25. The magnetic tape 13 is guided around the guide drum 18 in a helical path. Thus, the magnetic heads 26 and 27 scan along diagonal tracks on the tape 13, as indicated diagrammatically in FIGURE 2.

In the recording operation, an input signal at a terminal $t_1$ is applied to a frequency modulator 28. The resulting frequency modulated signal is applied to a recording amplifier 29. During the reproducing operation, signals from the heads are applied through a reproducing amplifier 30 to a demodulator 31 having an output connected to an output terminal $t_2$.

In accordance with this invention, clamping circuits 32 and 33 are respectively coupled to the reproducing and recording amplifiers 30 and 29, and they are controlled from a motor 34 used to drive the disk 25, by means of a tone-wheel device 35. To couple the heads 26 and 27 to the recording and reproducing amplifiers 29 and 30, a commutator 36 is provided on the disk 25. The commutator segments are coupled to the heads 26 and 27. A brush 37 engages the commutator 36 and is connected to a switch 38. Thus, as the disk and commutator rotate, the heads are selectively connected either to terminal *a* which is connected to the output of the recording amplifier 29, or to terminal *b* which is connected to the input of the reproducing amplifier 30.

In operation, a television video signal applied to terminal $t_1$ is converted into a frequency modulated signal by the frequency modulator 28. This FM signal is then applied through the recording amplifier 29 and the switch 38 to the brush 37. The brush 37 alternately or sequentially engages the segments of the commutator 36 to thereby be alternately or sequentially connected to the magnetic heads 26 and 27. Preferably, the rotation of the disk 25 is synchronized with the fields or frames of the television video signal. Thus, one or an integer number of fields or frames is recorded on each track.

During reproducing, signals developed by the heads 26 and 27 are alternately or sequentially applied through the commutator segments 36 to the brush 37 and through the switch 38 to the reproducing amplifier 30. These signals are demodulated by the demodulator 31 and applied to the output terminal $t_2$, as a television video signal.

If there are variations in the characteristics of the magnetic heads 26 and 27 or in the inter-engagement of the heads 26 and 27 with the magnetic tape 13, there are corresponding variations in the signals as recorded and in the signals which are reproduced. For example, if magnetic head 26 were less sensitive than magnetic head 27, a frequency modulated signal of constant value at the output of the recording amplifier 29 would be recorded weakly on the magnetic tape 13 when applied to the magnetic head 26 and would be recorded strongly when applied to the magnetic head 27. The same would be true in the reproducing operation. The signals reproduced by magnetic head 26 would be weak while those reproduced by the magnetic head 27 would be strong. Accordingly, the presence of variations in the characteristics of the magnetic heads would result in the operation or saturation level. These variations reduce the signal-to-noise ratio and make it impossible to provide a good reproduced picture.

This invention overcomes these such disadvantages by making it possible to adjust, in the recording operation, the levels of signals to be recorded as they are applied to the magnetic heads, independently of each other. Also, during playback, the levels of the signals reproduced by the magnetic heads are adjusted independently of each other.

In particular, the clamping circuits 32 and 33 are controlled responsive to the tone-wheel device 35 as it is driven by the head drive motor 34.

FIGURE 3 shows the circuit of the recording amplifier 29 which may be substantially identical to that of the reproducing amplifier 30. The clamping circuit 33 may be identical to the clamping circuits 32. In FIGURE 3, the transistor $TR_1$ and transistor $TR_2$ are amplifying transistors; $TR_3$ is a phase dividing transistor; and transistors $TR_4$ and $TR_5$ are switching transistors; the remaining components are resistors $R_1$, $R_2$ . . . $R_{15}$, capacitors $C_1$, $C_2$ . . . $C_9$, inductor L, variable resistors $VR_1$ and $VR_2$, and terminals $t_3$, $t_4$ and $t_5$. During recording, terminal $t_3$ is connected to the output of the frequency modulator 28, while terminal $t_4$ is conected to the terminal *a* of the change over switch 38, preferably through several stages of amplifying circuits. During playback, terminal $t_3$ is connected to terminal *b* of the change over switch 38, and terminal $t_4$ is connected to the input of the demodulator 31, preferably through several amplifying stages. Terminal $t_5$ is connected to the tone-wheel device 35.

In the recording operation, the frequency modulated signals which are to be recorded are applied to the terminal $t_3$. The frequency modulated signals are a continuous wave form and of constant amplitude as shown in FIGURE 5(*a*). At the same time, a square wave signal, as indicated in FIGURE 5(*b*), is applied from the tone-wheel device 35 to the terminal $t_5$. By way of example, the square wave signal may have a frequency of 30 cycles per second, assuming that the magnetic heads 26 and 27 are rotated at a speed of 30 revolutions per second.

The square wave signal from the tone-wheel device 35 is applied through the terminal $t_5$ and the capacitor $C_5$ to the base of the transistor $TR_3$. This develops a square wave signals, in a 180 degree phase relation, at the emitter and collector electrodes of the transistor $TR_3$ which are connected through the resistors $R_{11}$ and $R_{10}$ to ground and to a −B terminal, of the power supply. The signal developed at the emitter of transistor $TR_3$ is in phase with that applied to terminal $t_5$. Thus, the signal at terminal $t_5$ has a waveform as indicated in FIGURE 5(*b*), while the signal at the collector transistor $TR_3$ has a similar waveform which is displaced by 180°, as indicated in FIGURE 5(*d*).

The signals developed at the collector and emitter electrodes of the transistor $TR_3$ are applied through the capacitors $C_6$ and $C_7$ to the base electrodes of transistors $TR_4$ and $TR_5$. The emitters of transistors $TR_4$ and $TR_5$ are connected to ground. The collectors thereof are connected through variable resistors $VR_1$ and $VR_2$, capacitors $C_8$ and $C_9$, capacitors $C_2$ to the collector of transistor $TR_1$, and capacitors $C_3$ to the base of transistor $TR_2$.

The transistors $TR_4$ and $TR_5$ operate as switching transistors to alternately present low impedances in series with the variable resistors $VR_1$ and $VR_2$. Thus, the transistors $TR_4$, $TR_5$ couple the variable resistors $VR_1$ and $VR_2$ into a parallel relationship with the output of the amplifying transistor $TR_1$.

The operation may be clarified by reference to the equivalent circuit shown in FIGURE 4. The generator E represents the amplitude of a frequency modulated signal from a source as indicated. The resistor $r_1$ represents the effective internal impedance of the signal source. The impedance of transistor $TR_4$ is represented by resistor $r_2$ and the voltage $E_O$ represents the voltage developed across $r_2$ and $VR_1$ in series, i.e. the voltage applied to the amplifying transistor $TR_2$.

When the voltage applied to the base of transistor $TR_4$ moves in a negative direction, the impedance of the transistor $TR_4$ drops to a low value so that the impedance in parallel relation to the output circuit of the transistor $TR_1$ also drops, to lower drop output signal voltage $E_O$. This voltage can thus be expressed in terms of the input signal E, as follows:

$$E_O=\frac{E(VR_1+r_2)}{r_1+VR_1+r_2}$$

In the circuit, the impedance $r_2$ of the transistor when a negative signal is applied to the base of the transistor $TR_4$, the impedance $r_2$ is much smaller than the internal impedance $r_1$ of the amplifying stage including transistor $TR_1$. Then the above formula becomes effective, as follows:

$$E_O=\frac{VR_1}{r_1+VR_1}E$$

From this, it will be seen that the level of the output signal $E_O$ can be adjusted as desired by changing the value of the variable resistor $VR_1$. In the same manner, during the application of a negative voltage to the base of the transistor $TR_5$, the level of the output signal can be adjusted as desired by changing the value of the variable resistor $VR_2$.

Considering only the operation of the transistor $TR_4$, by way of example, the effect on the frequency modulated signal is indicated in FIGURE 5(c). It will be observed that the signal is reduced in amplitude only when the signal applied to the base of transistor $TR_5$ is at negative level, as indicated in FIGURE 5(*b*). Similarly, when considering only the operation of the transistor $TR_4$, the effect on the frequency modulated signal is indicated at FIGURE 5(*e*). It will be observed that the signal is reduced in amplitude only when a negative signal is applied to the base of transistor $TR_4$, as indicated at FIGURE 5(*d*). When the two effects are combined, a signal is produced as shown in FIGURE 5(*f*). The signal (−38 db) during the scanning of the tape by one head has a higher amplitude than the signal (−40 db) during scanning by the other head.

Accordingly, it is possible to readily adjust for differences in the characteristics of the two heads during recording.

It should be noted that when a positive signal is applied to the base electrode of either of the transistors $TR_4$ or $TR_5$, the impedance $r_1$ becomes smaller than impedance $r_2$, so that the first formula above can be written as $$E_O=\frac{E(VR_1+r_2)}{r_1+VR_1+r_2}\div\frac{VR_1+r_2}{VR_1+r_2}E=E$$

Accordingly, the value of the output signal will not be effected by the value of the variable resistor of the transistor to which the positive signal is applied.

The above explanation has been made with reference to the recording operation. During reproducing, the operation is the same, except that the input signal will have level differences therein, which can be adjusted through operation of the circuit of this invention to provide an output signal of substantially constant amplitude.

It will be understood that modifications and variations may be effected without departing from the spirit and scope of the novel concepts of this invention.

We claim as our invention:

1. In a magnetic recording or reproducing system including a plurality of rotating magnetic heads for sequentially scanning a magnetic medium, signal transmission means in one channel including at least one amplifier for sequentially transmitting a signal to or from said heads, means for developing a control signal synchronized with the rotation of said heads, a plurality of impedance means respectively corresponding to said heads, switching means controlled responsive to said control signal for sequentially connecting said impedance means into a parallel relationship with respect to the output circuit of said amplifier, and control means responsive to said control signal for controlling signal strength in said signal transmission means to control the relative amplitude levels of the transmission of said signal during the respective time intervals of sequential scanning of the medium by said magnetic heads so that the signal output levels from said signal transmission means are maintained substantially uniform.

2. In a magnetic recording or reproducing system as defined in claim 1 wherein said one channel signal transmitting means is arranged to receive a signal to be recorded at one level and to transmit said received signal at another amplitude level-controlled responsive to said control signal to said magnetic heads which record at said other level.

3. In a magnetic recording or reproducing system as defined in claim 1 wherein said signal transmitting means is arranged to receive reproduced signals from said plurality of heads and to transmit a combined output signal.

4. In a magnetic recording or reproducing system as defined in claim 1 wherein said plurality of impedance means are adjustable to select the relative amplitude levels of said signal during the respective time intervals while said heads are sequentially scanning the medium.

5. In a magnetic recording or reproducing system as defined in claim 1, said switching means comprising a plurality of transistors respectively connected in series with said impedance means, and switch-control means responsive to said control signal for sequentially rendering said transistors conductive.

6. In a magnetic recording or reproducing system as defined in claim 5, said switch-control means including a transistor having emitter and collector electrodes coupled to said switching transistors and having a base electrode coupled for application of said control signal thereto.

7. In a magnetic recording or reproducing system as defined in claim 1, power supply means having first and second terminals, said amplifier being coupled to said first and second power supply terminals, said impedance means comprising a plurality of resistors respectively corresponding to said heads, said switching means comprising a plurality of switching transistors each having base, emitter and collector electrodes, means connecting said collector electrodes to said resistors, means coupling said emitter electrodes to said first power supply terminal, and switch-control means responsive to said control signal for applying signals to said base electrodes of said switching transistors for sequentially rendering said transistors conductive.

8. In a magnetic recording or reproducing system as defined in claim 7, said plurality of rotating magnetic heads being a pair of diametrically opposed heads for alternately scanning the magnetic medium, and said control signal being a square wave signal having one level during scanning of the magnetic medium by one of said heads and having a different level during scanning of the medium by the other of said heads.

9. In a magnetic recording or reproducing system as defined in claim 8, said switch control means including a switch-control transistor having emitter and collector electrodes coupled to said base electrodes of said switching transistors and having a base electrode coupled for application of said control signal thereto.

References Cited

UNITED STATES PATENTS

| | | | |
|---|---|---|---|
| 3,031,525 | 4/1962 | Oniki | 178—6.6 |
| 3,350,504 | 10/1967 | Takayanagi | 178—6.6 |
| 3,381,083 | 4/1968 | Jensen et al. | 178—5.2 |

FOREIGN PATENTS 6,595 6/1961 Japan.

BERNARD KONICK, Primary Examiner

J. P. MULLINS, Assistant Examiner

U.S. Cl. X.R.

178—6.6